(12) United States Patent
Moriarty

(10) Patent No.: US 6,257,977 B1
(45) Date of Patent: Jul. 10, 2001

(54) ROTARY COMBINE HAVING A ROTOR AXIS DIVERGENT FROM A ROTOR HOUSING AXIS

(75) Inventor: Kevin Joseph Moriarty, Davenport, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/378,773

(22) Filed: Aug. 20, 1999

(51) Int. Cl.[7] .................................................. A01F 12/10
(52) U.S. Cl. ................................................. 460/68; 56/14.6
(58) Field of Search .............................. 56/14.6; 460/85, 460/73, 74, 84, 87, 88, 89, 113, 121, 22, 30, 32, 33, 46, 66, 71, 72, 110, 68, 69

(56) References Cited

U.S. PATENT DOCUMENTS

| 2,639,714 | * | 5/1953 | Moullec | 460/113 |
| 4,408,618 | | 10/1983 | Witzel | 130/23 |
| 5,445,563 | | 8/1995 | Stickler et al. | 460/69 |
| 5,688,170 | | 11/1997 | Pfeiffer et al. | 460/69 |
| 6,129,629 | | 10/2000 | Dammann et al. | 460/67 |

FOREIGN PATENT DOCUMENTS

| 278978 | * | 10/1914 | (DE) | 460/72 |
| 197 22 079 A1 | | 12/1998 | (DE) . | |

* cited by examiner

Primary Examiner—Robert E. Pezzuto
Assistant Examiner—Árpád Fábián Kovács

(57) ABSTRACT

A rotary crop-processing unit for an agricultural combine in which the rotor is mounted in a rotor housing with the rotor axis diverging from the housing axis in the crop flow direction through the crop-processing unit. The diverging rotor and housing axes enable the gap between the rotor and the top of the housing to increase in the crop flow direction without producing abrupt changes in the housing shape.

7 Claims, 5 Drawing Sheets

ROTARY COMBINE HAVING A ROTOR AXIS DIVERGENT FROM A ROTOR HOUSING AXIS

BACKGROUND OF THE INVENTION

1. Field of the Invention

The present invention is directed to an agricultural combine having a rotary crop processing unit with a rotor disposed within a rotor housing and in particular to such a combine in which the axis of the rotor diverges from the axis of the housing in the crop flow direction from the housing inlet to the housing outlet.

2. Description of Related Art

Rotary combines having rotary crop processing unit are well known. Examples are shown in U. S. Pat. Nos. 5,445, 563 and 5,688,170, assigned to the assignee of the present application. These two patents both disclose rotary crop processing units in which the crop processing unit has two or more sections. The relationship between the rotor axis and the housing axis varies from one section to the other. In both of these patents, the rotor axis becomes increasingly offset from the housing axis in the direction from the housing inlet to the housing outlet. This is accomplished by abrupt transitions in the housing structure from one section to another where the housing shape changes. As the housing shape changes, the housing axis steps upward relative to the rotor axis. The gap between the rotor and the top of the housing also increases at each step in the housing.

SUMMARY OF THE INVENTION

It is an object of the present invention to provide a rotary combine with an increasing gap between the rotor and the top of the housing in the crop flow direction with a housing that maintains a generally uniform shape without abrupt changes in the housing shape.

It is a feature of the present invention to provide a rotary combine with a rotor having an axis that is inclined relative to and diverges from the housing axis in the direction from the housing inlet to the housing outlet. By arranging the rotor so that the rotor axis diverges downward from the housing axis, the gap between the rotor and the top of the housing gradually increases over the length of the housing in the direction toward the housing outlet. The increased gap between the rotor and the housing is accomplished without any abrupt changes in the housing shape as in the previously mentioned patents.

The housing has a circular cross section in the preferred embodiment. The diverging rotor and housing axes, with the circular housing achieves the same benefit as the above patents of providing an increased gap between the top of the housing and the rotor without having transitions in the shape of the housing. This simplifies the housing construction. Furthermore, with a circular housing cross section, the present invention can be utilized with a rotating housing. A rotating housing is not possible with the rotary crop processing units described in the above patents. There, the housing must be stationary due to the non-circular shape of the housing.

The present invention, with a rotor axis that diverges from the housing axis, can, however, be used with a housing that also has abrupt transitions between sections. In such a case, the gap between the top of the housing and the rotor would vary from one section to the next while the rotor axis still diverges from the housing axis along each section. In addition, the invention can be utilized with a rotor housing that is oblong in cross section if desired.

DESCRIPTION OF THE PREFERRED EMBODIMENT

Figure 1:
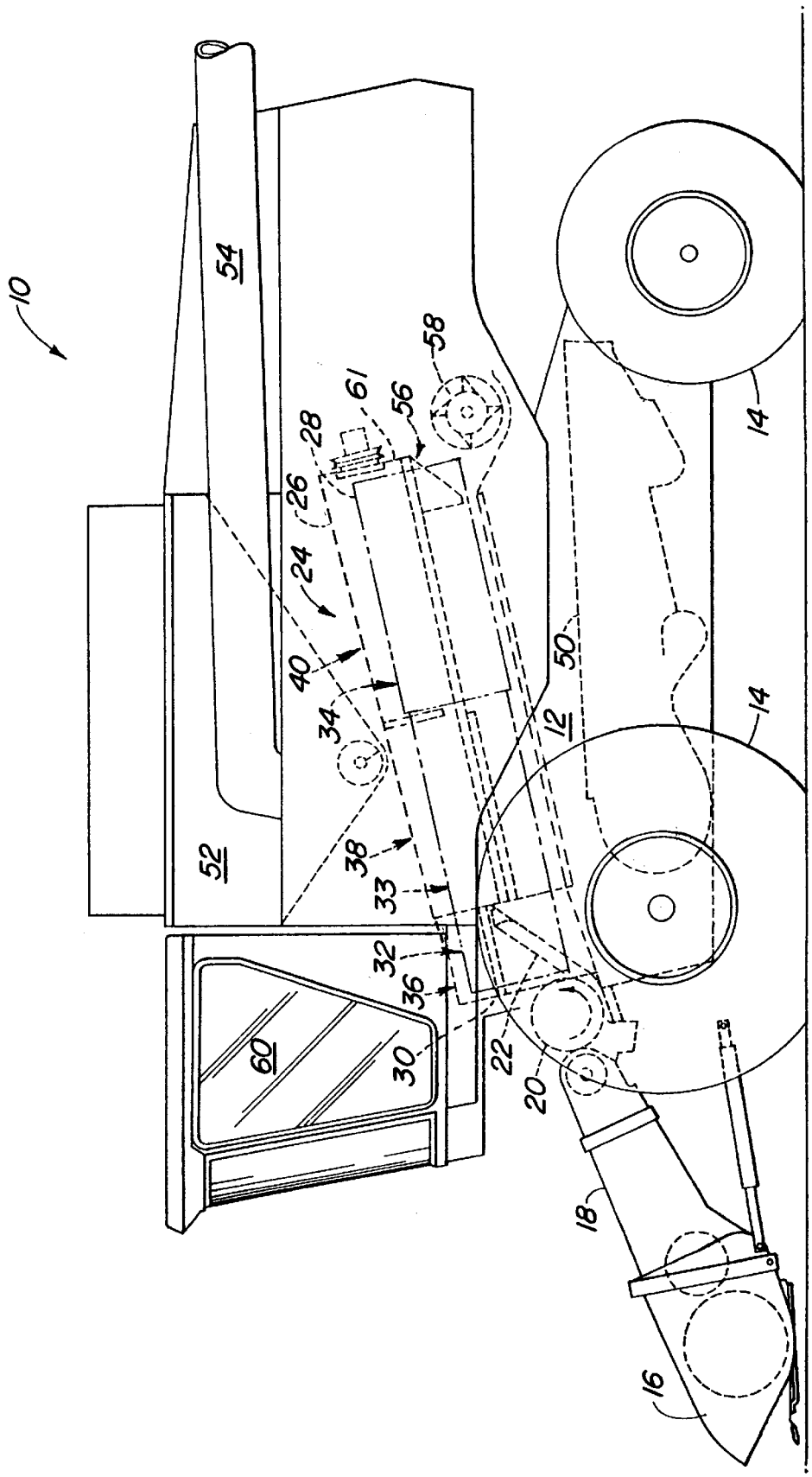
FIG. 1 is a side view of an agricultural combine having the rotary crop-processing unit of the present invention.

FIG. 1 shows an agricultural combine 10 comprising a supporting structure 12 having a ground engaging means 14 shown in the form of tires. Alternatively, tracks can be used in place of tires. A harvesting platform 16 is used for harvesting crop and directing it to a feederhouse 18. The harvested crop is directed by the feederhouse 18 to a beater 20. The beater directs the crop upwardly to a rotary crop-processing unit 24. The rotary crop-processing unit is located between the sidesheets of the combine. The sidesheets form part of the supporting structure 12.

The rotary crop-processing unit 24 comprises a rotor housing 26 and a rotor 28 located in the housing. The harvested crop enters the housing through an inlet 22 at the inlet end 30 of the housing 26. The rotor is provided with an inlet feed portion 32, a threshing portion 33, and a separating portion 34. The rotor housing has a corresponding infeed section 36, a threshing section 38 and a separating section 40.

Figure 2:
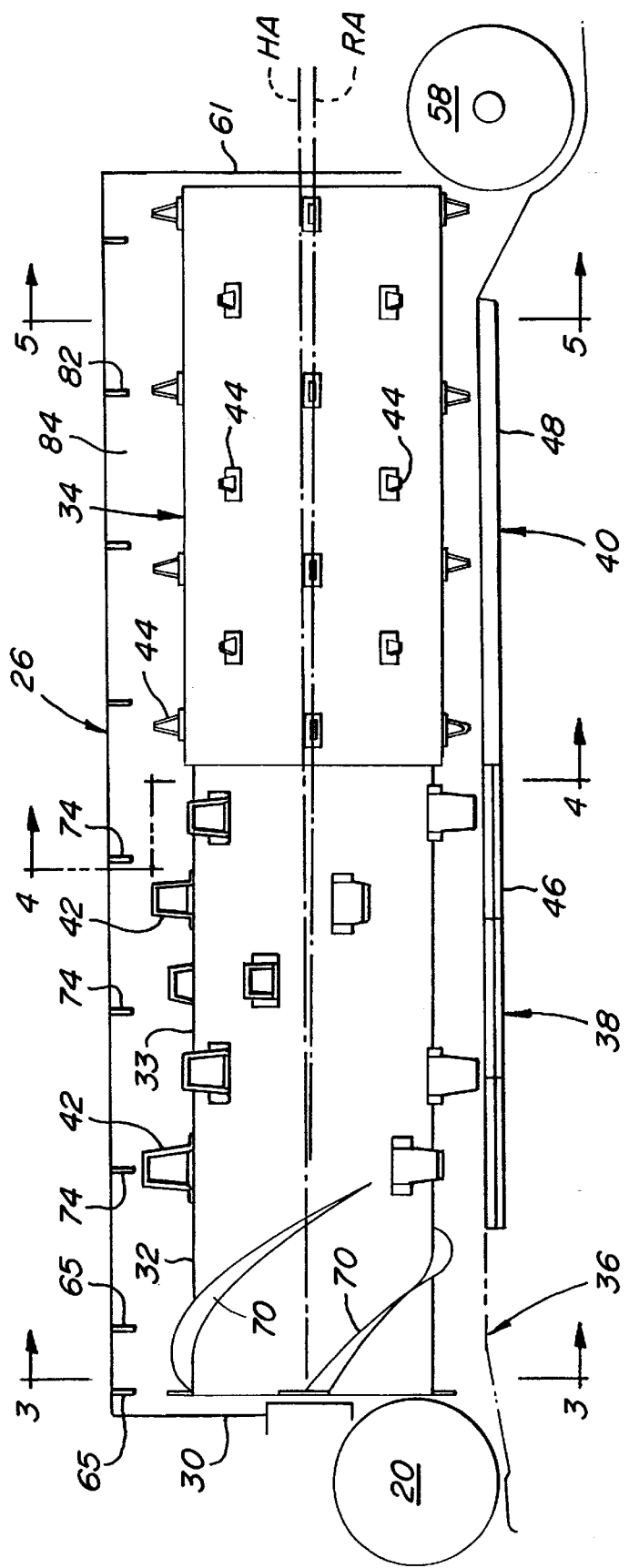
FIG. 2 is a cross-sectional side view of the rotary crop-processing unit of the present invention.

Both the threshing portion 33 and the separating portion 34 of the rotor are provided with crop engaging members 42 and 44, respectively, FIG. 2. The threshing section 38 of the housing is provided with a concave 46 while the separating section 40 of the housing is provided with a grate 48. Grain and chaff released from the crop mat falls through the concave 46 and grate 48. The concave and the grate prevent the passage of crop material larger than grain or chaff from entering the combine cleaning system 50 below the rotary crop-processing unit 24.

As illustrated in FIG. 1, grain and chaff falling through the concave and grate is directed to the cleaning system 50 that removes the chaff from the grain. The clean grain is then directed by an elevator (not shown) to clean grain tank 52 where it can be directed to a truck or grain cart by unloading auger 54. Straw that reaches the end 61 of the housing is expelled through an outlet 56 to a beater 58. The beater propels the straw out the rear of the combine. The end 61 is thus the outlet end of the housing. The crop material moves through the rotary crop-processing unit in a crop flow direction from the inlet end 30 to the outlet end 61 of the housing. The operation of the combine is controlled from operator's cab 60.

The rotor 28 defines a central rotor axis RA. The rotor axis RA is a straight line passing through the center of the infeed portion 32, the threshing portion 33 and the separating portion 34 of the rotor.

The rotor housing 26 defines a housing axis HA. The housing axis is a straight line passing through the infeed section 36, the threshing section 38 and the separating section 40 of the housing.

The rotor and the rotor housing are oriented relative to one another with the rotor axis RA and the housing axis HA diverging from one another in the direction of crop flow from the housing inlet end 30 to the outlet end 61. In the embodiment shown in FIG. 2, the rotor axis and housing axis are approximately concentric with one another at the inlet end 30 and diverge toward the outlet end. However, the two axes need not be concentric at the inlet end, but could be offset from one another at both the inlet and outlet ends.

Figure 3:
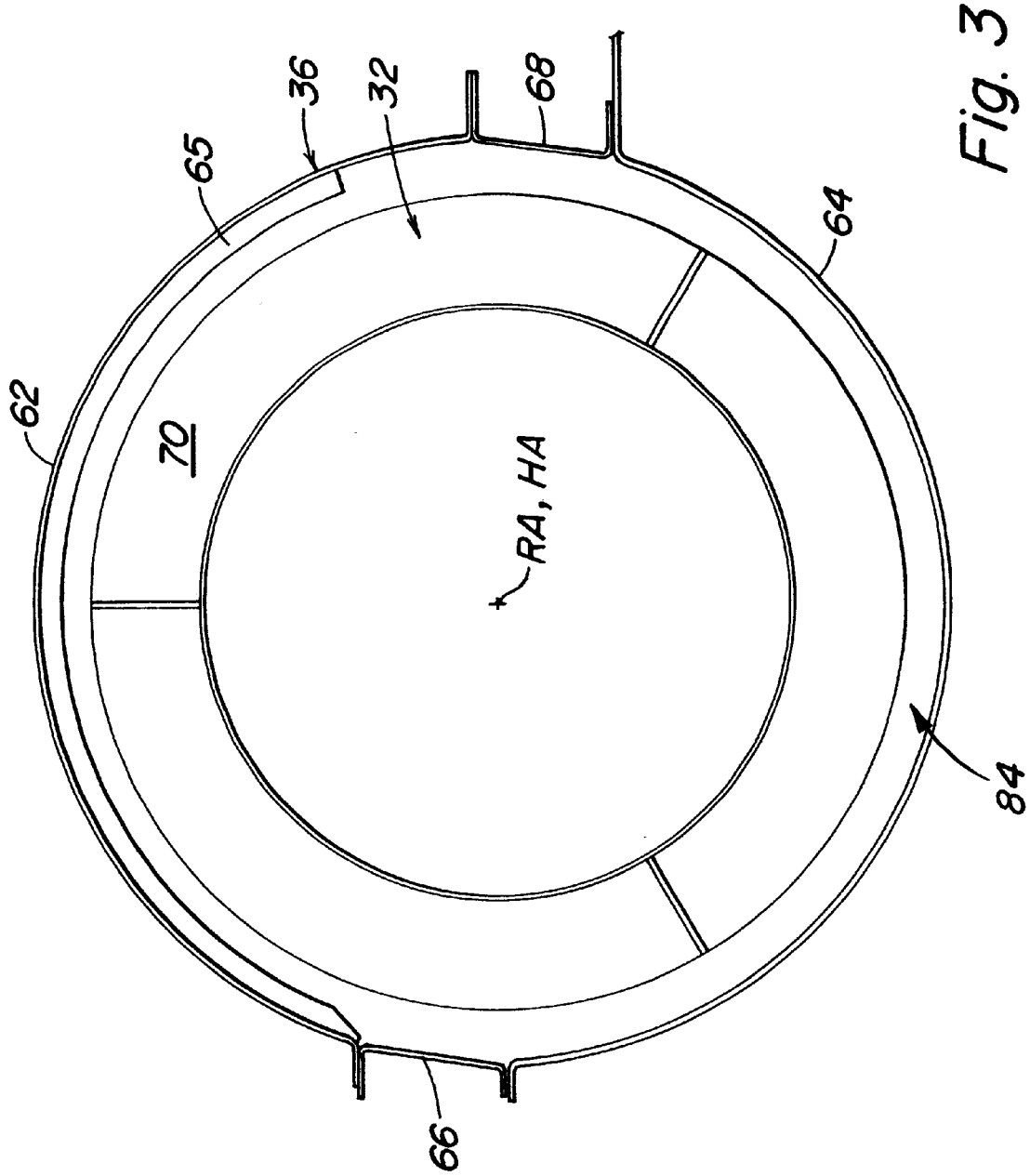
FIG. 3 is a cross-sectional transverse view of the infeed section of the rotary crop-processing unit taken along the line 3—3 of FIG. 2.

As seen in FIG. 3, the infeed section 36 of the housing 26 is provided with a closed cover 62 and a closed bottom 64. The cover 62 is provided with helical indexing vanes 65. The cover and bottom are bolted to axial rails 66, 68. The rotor is provided with helical vanes 70. The forward portion of the closed bottom 64 is provided with an inlet transition section 69 which is substantially identical to the one disclosed in U. S. Pat. No. 5,344,367. The closed cover 62 of the infeed section 36 defines the housing axis HA through the infeed section.

Figure 4:
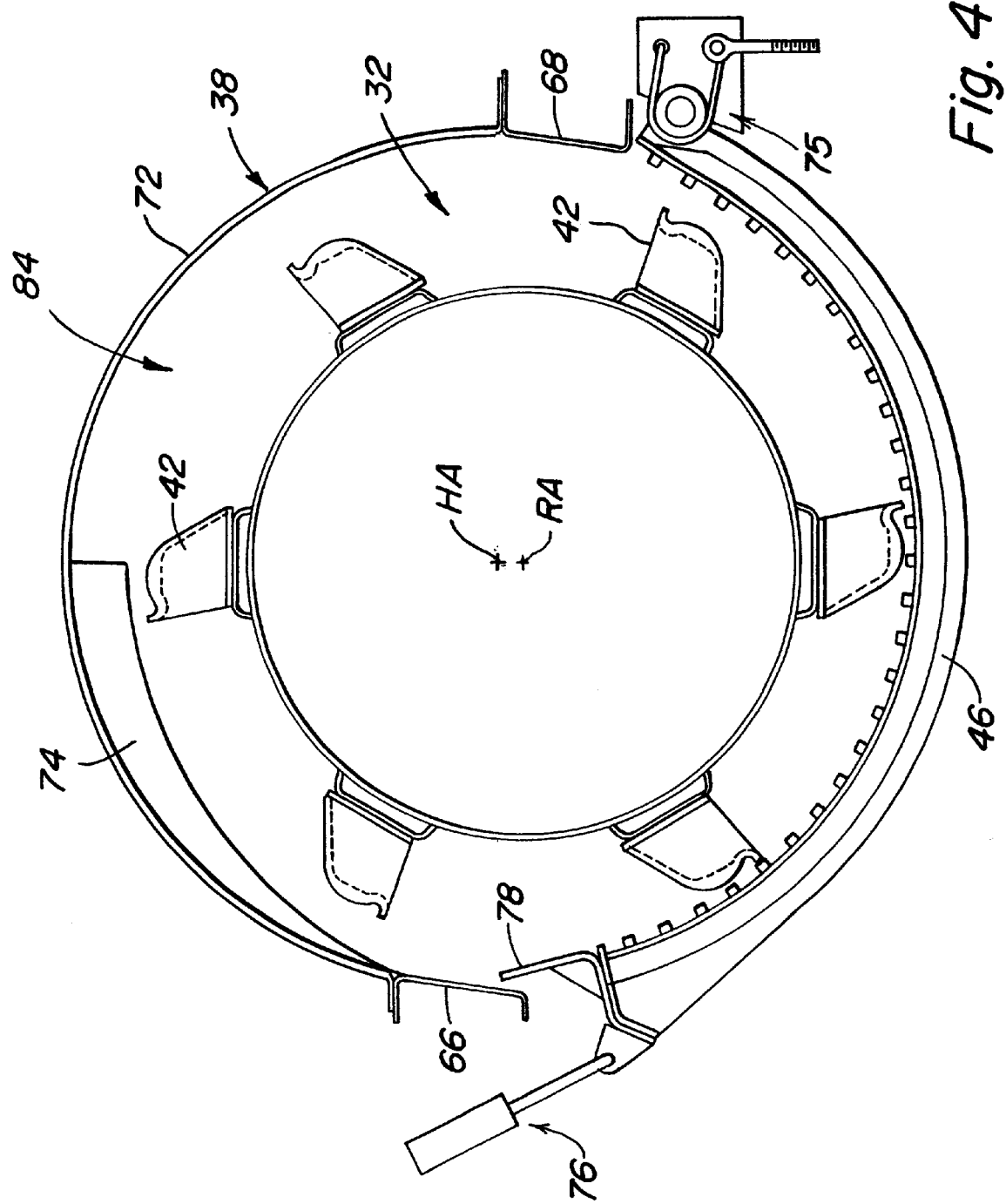
FIG. 4 is a cross-sectional transverse view of the threshing section of the rotary crop-processing unit taken along the line 4—4 of FIG. 2.

As seen in FIG. 4, the threshing section 38 is provided with a closed threshing cover 72 having helical indexing vanes 74. The cover 72 is bolted to the axial rails 66, 68. The concave 46 is pivotally mounted to the frame of the combine below rail 68 at 75. An adjustment assembly 76 for adjusting concave clearance is mounted to the frame of the combine below rail 66. The concave 46 includes a closed extension 78.

The threshing cover 72 defines the housing axis HA through the threshing section 38 of the housing. The housing axis HA is defined by the cover 72 and not by the concave 46. Since the cover 72 is fixed in place, the housing axis HA is fixed relative to the rotor axis RA. The concave is movable relative to the rotor by the adjustment assembly 76. Thus, the axis of the concave is not fixed relative to the rotor axis RA.

Figure 5:
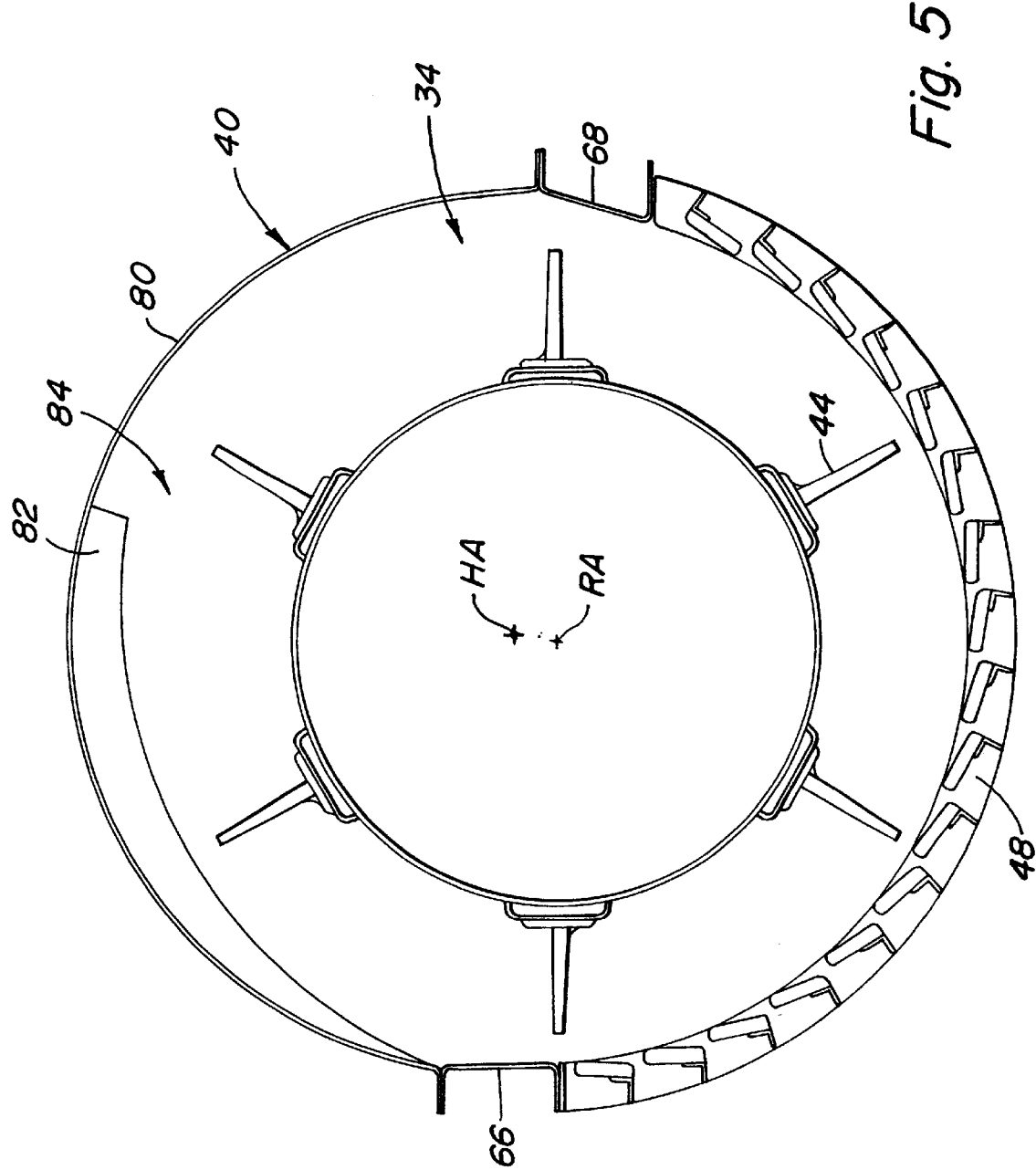
FIG. 5 is a cross-sectional transverse view of the separating section of the rotary crop-processing unit taken along the line 5—5 of FIG. 2.

The separating section 40 is provided with a separating cover 80 having helical vanes 82 as seen in FIG. 5. The cover 80 is bolted to the axial rail 66, 68. The grate 48 is also bolted to the rail 66, 68 and is similar to the grate disclosed in U. S. Pat. No. 4,875,891. The separating cover 80 defines the housing axis HA through the separating section 40. In the preferred embodiment, the housing cross section is circular and the housing axis HA forms a straight line as shown in FIG. 2.

The housing 26 is spaced from the rotor 28, forming an annular gap 84 between the rotor and the housing for crop material to flow through, as the crop material moves in a crop flow direction from the inlet end to the outlet end of the housing. As the crop material moves toward the outlet end of the housing, the size of the gap between the rotor and the upper portion of the housing increases while the size of the gap between the rotor and the lower portion of the housing decreases. As a result of the changing size of the gap, the crop engaging members 42 and 44 may vary in size axially along the length of the rotor such that the crop engaging members 42 closest to the inlet end project further radially from the surface of the rotor than the crop engaging members 42 closest to the outlet end 61. The varying radial projection of the crop engaging members 42 enables the clearance between the crop engaging members 42 and the concave 38 to remain constant through the entire threshing section 38. Likewise, the crop engaging members 44 may vary in their radial projection through the separating section 40. Alternatively, the crop engaging members 44 may be of a constant radial projection that is short enough to avoid interference with the grate 48 at the smallest clearance between the rotor and the grate.

An advantage of the diverging rotor and housing axes is the ability to increase the gap between the rotor and the top of the housing toward the outlet end with a simply housing having a uniform, preferably circular, shape. The invention produces a constant, uniform, increase in the gap toward the outlet end. The invention can, however, be used with a housing that is not circular in cross section or that has separate sections where the housing shape makes an abrupt transition as shown in the prior patents discussed above. In such a case, the rotor axis would diverge from the housing axis as described within each of the sections.

The invention should not be limited to the above-described embodiment, but should be limited solely by the claims that follow.

What is claimed is:

1. A threshing and separating mechanism for a combine having a supporting structure, the mechanism comprising:
   an elongated rotor mounted in the supporting structure for rotation about a rotor axis;
   a generally tubular housing mounted in the supporting structure and surrounding the rotor, the housing defining a housing axis and the housing being spaced from the rotor to form an annular space therebetween for crop material to flow between the rotor and the housing in a crop flow direction from an inlet end of the housing to an outlet end of the housing;
   the rotor and the housing being positioned relative to one another such that the rotor axis diverges from the housing axis in the crop flow direction.

2. The threshing and separating mechanism as defined by claim 1 wherein the rotor axis and the housing axis are generally concentric at the inlet end of the housing.

3. The threshing and separating mechanism as defined by claim 1 wherein the rotor axis is below the housing axis at the outlet end of the housing resulting in a larger space between the rotor and an upper portion of the housing than between the rotor and a lower portion of the housing.

4. The threshing and separating mechanism as defined by claim 1 wherein the housing is generally circular in cross section.

5. A threshing and separating mechanism for a combine having a supporting structure, the mechanism comprising:
   an elongated rotor mounted in the supporting structure for rotation about a rotor axis;
   a generally tubular housing mounted in the supporting structure and surrounding the rotor, the housing defining a housing axis and the housing being spaced from the rotor to form an annular space therebetween for crop material to flow between the rotor and the housing in a crop flow direction from an inlet end of the housing to an outlet end of the housing,
      the rotor and the housing being configured and disposed relative to one another such that the space between a top portion of the housing and the rotor gradually increases in the crop flow direction.

6. The threshing and separating mechanism as defined by claim 5 wherein the space between a bottom portion of the housing and the rotor gradually decreases in the crop flow direction.

7. The threshing and separating mechanism as defined by claim 6 further comprising a multitude of crop engaging elements projecting radially from the rotor wherein the extent of radial extension of the crop engaging elements decreases in the crop flow direction over at least a portion of the axial length of the rotor.

* * * * *